United States Patent [19]

Hickel et al.

[11] Patent Number: 4,799,626
[45] Date of Patent: Jan. 24, 1989

[54] KITCHEN APPARATUS FOR PREPARING FOOD

[75] Inventors: Sigrun Hickel, Waldems; Wolfgang Franke, Langen, both of Fed. Rep. of Germany

[73] Assignee: Braun Aktiengesellschaft, Kronberg, Fed. Rep. of Germany

[21] Appl. No.: 107,951

[22] Filed: Oct. 13, 1987

[30] Foreign Application Priority Data

Oct. 31, 1986 [DE] Fed. Rep. of Germany ....... 3637169

[51] Int. Cl.$^4$ ............................................ A47J 43/046
[52] U.S. Cl. ..................................... 241/37.5; 241/92; 241/282.1
[58] Field of Search ................ 261/DIG. 16; 241/92, 241/37.5, 282.1, 36, 282.2

[56] References Cited

U.S. PATENT DOCUMENTS 2,678,053  5/1954  Denardis ............................... 241/92
4,397,427  8/1983  Howard ............................. 241/92 X

FOREIGN PATENT DOCUMENTS 101237   2/1984  European Pat. Off. .
3308166  9/1983  Fed. Rep. of Germany .
3126956  3/1985  Fed. Rep. of Germany .
2552647  5/1985  France .

Primary Examiner—Mark Rosenbaum

[57] ABSTRACT

The invention is directed to a food processing apparatus (2) having a lid (22) adapted to be placed on a vessel (10), with a cover member (26) of semi-circular cross section and having a passage (24) opening into the vessel (10) being provided on the lid. The cover member (26) is provided with a vertically extending rectangular receiving opening (32) for receiving a semi-cylindrical receptacle (34) adapted to swivel through 180° between a loading position and a discharge position. The receptacle (34) is adapted to receive whole fruits (45) without the operator contacting the shredding or cutting tools (12, 13), because the receiving opening (32) is closed in the loading position of the receptacle (34). Following loading of the fruits (45) into the receptacle (34), the latter is swivelled through 180°, enabling the fruits to be discharged through the passage (24) into the vessel (10) where a cutter blade (12) is used, while in the use of a shredding or cutting disc (13) the fruits will come to lie on the disc for being processed following which they will drop into the lower part of the vessel (10). With the receptacle (34) in the discharge position, the processing tool (12) is not accessible from the outside either because in this position, too, the receptacle (34) maintains the receiving opening (32) closed.

18 Claims, 4 Drawing Sheets

KITCHEN APPARATUS FOR PREPARING FOOD

This invention relates to a kitchen apparatus for preparing, including, for example, blending, mixing, kneading or cutting, food, with a processing tool rotatably arranged in a vessel and a feed device provided on a lid of the vessel, the feed device comprising a receptacle for receiving the food and a cover member, with the kitchen apparatus being adapted to be put into operation only after the receptacle has been received in the receiving opening of the cover member.

A food processing apparatus is already known (FR-AS 2,552,647) which includes a processing container with a feed device comprised of a top structure provided on the cover and having at its side an approximately rectangular inlet opening. A receptacle is horizontally slidable in the inlet opening between a filler opening and a discharge opening. The receptacle is comprised of a sliding means horizontally slidable in a covering portion of the cover. The receptacle is provided with a filler opening and a discharge opening. With the sliding means in the loading position, the filler opening of the receptacle is upwardly open, enabling larger fruits to be placed into the receptacle, whilst in this position the discharge opening is closed by the bottom of the cover. Also, access to the processing container is closed by the end face of the receptacle, so that the user cannot by accident reach inside the processing container.

Moving the receptacle from the loading position into the discharge position causes the discharge opening of the receptacle to be opened, enabling the fruit material to pass through an aperture provided in the cover into the container. In this position, the rear side of the sliding means will likewise close the aperture of the feed device, so that in this position, too, the user is prevented from inadvertently reaching inside the processing container. The covering portion of the cover further provides a feed hole the second filler opening of which permits smaller fruits to be fed. The diameter of the second filler opening is dimensioned such as to be too small for a user's hand so that contact with the processing tool is avoided, preventing the possibility of personal injury. This arrangement has, however, the disadvantage that, as a result of the horizontal displacement of the receptacle, its area of cross section cannot be dimensioned to an optimally large size.

Further, a kitchen apparatus having a feed device of the type initially referred to is known (EP-A 01 01 237) which is likewise comprised of a covering member provided on the lid of the processing container and of a receptacle, these members being configured such that the covering member is adapted to be swivelled over the receptacle, thus restricting the area of cross section of the filler opening of the receptacle so that the user's hand can no longer reach inside the appliance. Only after the covering member has been slid over the receptacle will a switch contact be activated by a tab provided on the covering member, whereby the appliance is put into its operating position. Since the receptacle covers only a small part of the lid surface of the container, the capacity of the receptacle is very small, enabling only relatively small whole fruits to be loaded into the receptacle.

By contrast, it is an object of the present invention to configure and arrange receptacle and cover member in such a manner as to enable relatively large fruits or large pieces of food material to be loaded into the receptacle, without access to the processing tool inside the container being possible.

This object is accomplished by the invention in that the receptacle is adapted to be swivelled about an axle extending substantially parallel to the axis of rotation of the processing tool, and that the axle of the receptacle is provided in approximately the same plane as the receiving opening of the cover member. Since the receptacle is arranged in the region of the same plane as the receiving opening of the cover member, it is possible to keep the receiving opening closed by means of the receptacle in both the loading and the discharge position of the receptacle, so that the possibility of access to the inside of the processing vessel is eliminated in either position of the receptacle, thereby preventing personal injury by the rotating processing tools, in particular cutting or shredding discs. The receptacle being completely received in the cover member, a maximum possible filler opening is provided and consequently also a maximum possible packing space, particularly for large fruits, in the receptacle.

Advantageously, a maximum possible packing space is obtained if the receptacle is arranged on the lid in a manner enabling it to swivel through 180° between a first position which is the loading position and a second position which is the discharge position, in which latter position it is completely received by the receiving opening of the cover member, with an end wall of the receptacle serving at the same time as closure element for the receiving opening of the cover member when the receptacle is in either the one or the other (swivelled through 180°) position. This is accomplished in that the receptacle has at least one vertically extending side wall the width and length of which correspond approximately to the size of the receiving opening.

For maximum possible capacity of the receptacle holding the food materials, the cover member advantageously includes a semi-cylindrical housing member into which the likewise semi-cylindrical, yet somewhat smaller, receptacle is adapted to swivel to be received therein completely. For the cover member to provide access to the vessel while being at the same time outwardly closed, an improvement of the invention provides for the lid or its annular flange member to have a semicircular passage above which the semi-cylindrical cover member is arranged having its upper edge closed by a semi-circular lid.

The semi-cylindrical configuration of receptacle and cover member advantageously results in a rectangular area of cross section of the receiving opening in the cover member.

To ensure that the lid completely encloses and safely covers the cylindrical vessel, the invention provides for the lid to be formed of a cylindrical lid segment and a semi-cylindrical cover member.

Further, it is also possible to provide, in addition to the receptacle, a second feed device in the cover member, which feed device has a filler opening of a cross sectional area dimensioned such as to prevent the operator from reaching inside the vessel, thus obviating personal injury.

The covering member combines with the receptacle to provide a cylindrical structure adapted to fit the diameter of the vessel when food materials may be laded into the receptacle, that is, with the receptacle in the drawn out position. This provides for homogeneity of form of vessel, receptacle and cover member.

An advantageous mounting of the receptacle is obtained by having the axle of the receptacle or the trunnions which are provided on the cover member rotatably engaged with the lid segment of the vessel at one end and with the lid segment of the cover member at the other end.

In an improvement of the invention a stop means is provided on the receptacle which unlocks a safety device provided in the housing of the kitchen apparatus only after proper closing of the receiving opening by the receptacle, of the, opening of the vessel by the cover member, and of the lid segment. It is thereby ensured that the safety device is not unlocked until after the receiving opening in the cover member has been properly closed by the receptacle, that is, until after the receptacle is completely swivelled inside the cover member, whereupon the switch can be activated to turn on the apparatus.

An embodiment of the invention will be explained in more detail in the following with reference to the drawings. Referring to the drawings, FIG. 1 is a perspective view of a kitchen apparatus for preparing food, including a feed device for holding large pieces of food constructed in accordance with the invention, with a cutter blade being arranged in the vessel;

For reasons of simplicity, like parts have been assigned like reference numerals throughout FIGS. 1 to 5.

Figure 1:
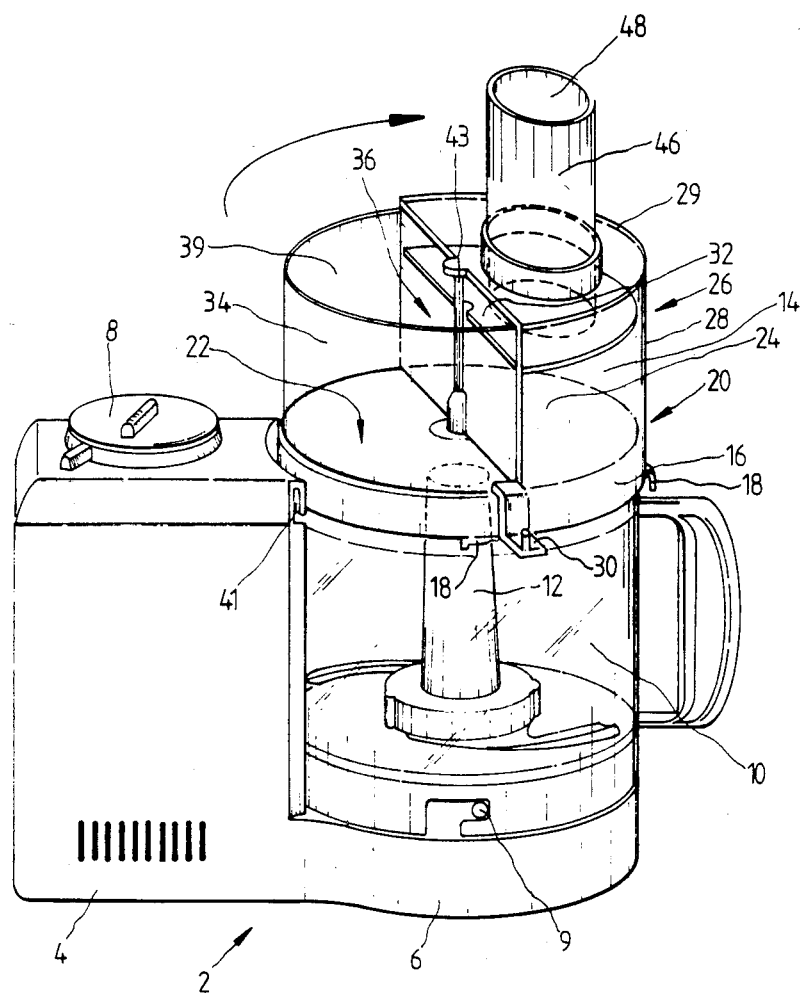
FIG. 1A is a view corresponding to FIG. 1, showing, however, a shredding tool with a disc mount arranged in the vessel in lieu of the cutter blade.
Figure 1A:
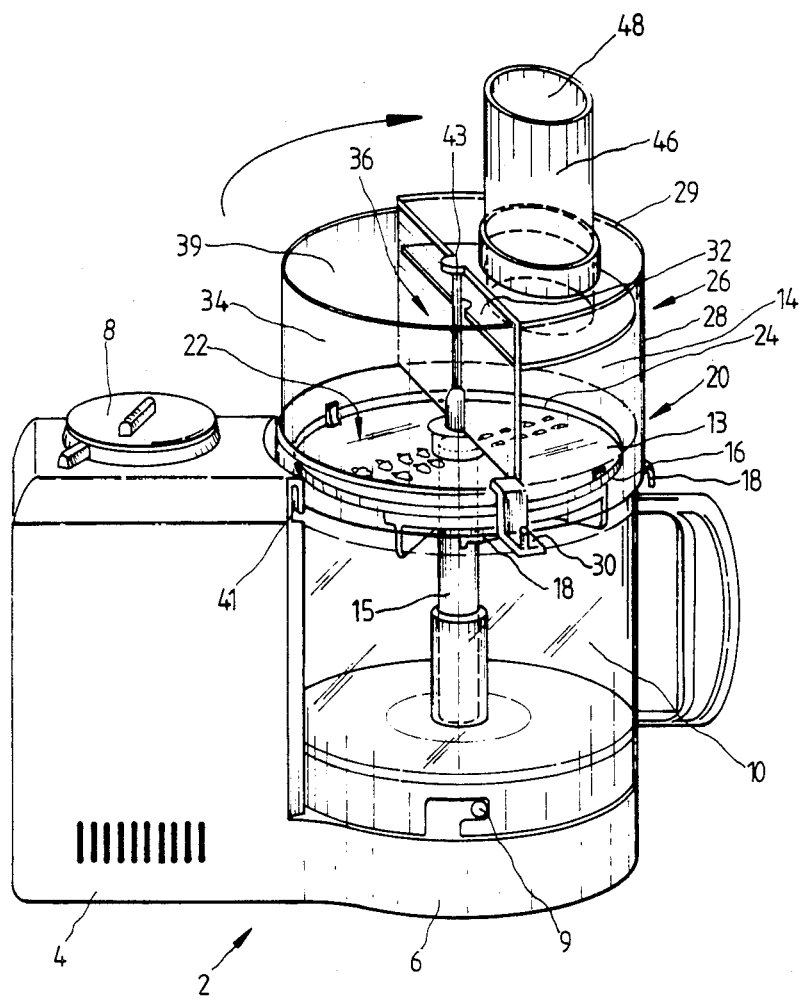

Referring now to FIGS. 1 and 1A of the drawings, reference numeral 2 identifies a kitchen apparatus for preparing food, the processing tasks including blending, mixing, kneading, beating or cutting, comprising a housing 4 accommodating a motor drive mechanism not shown and a base 6 integrally formed on the housing 4. The motor of the food processing apparatus 2 is adapted to be energized through a switch 8 which can be turned on only after the stop means 30 has unlocked a safety lock provided in the housing 4 but not shown in the drawings.

Seated on the base 6 is a processing vessel 10 adapted to be firmly secured to the base 6 by engaging means 9. In FIG. 1, the vessel 10 accommodates a processing tool 12 in the form of a double-edged blade installed on a drive shaft coaxially in the vessel 10 and driven by the motor and a belt drive mechanism. Other processing tools such as cutting discs, whisks for whipping cream, etc. may be substituted for the blade 12 of FIG. 1. Accordingly, in lieu of the double-edged blade 12 of FIG. 1, a shredding disc 13 is shown in FIG. 1A, with a disc mount 15 carrying the shredding disc and being likewise driven by a drive shaft, not shown in the drawing, from the bottom of the vessel 10. The shredding disc 13 is arranged a small amount below the lid segment 22.

Figure 2:
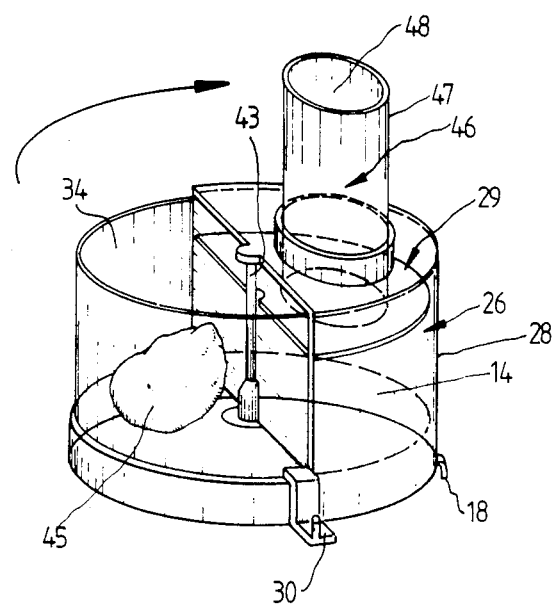
FIG. 2 is a perspective view of the feed device adapted to be placed on the top of the food processor in the loading position.
Figure 3:
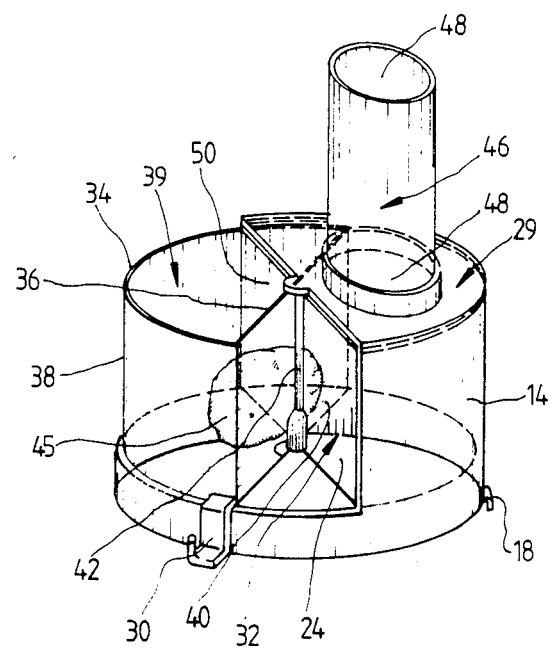
FIG. 3 is a perspective view showing the receptacle of the feed device in a partially retracted position.
Figure 4:
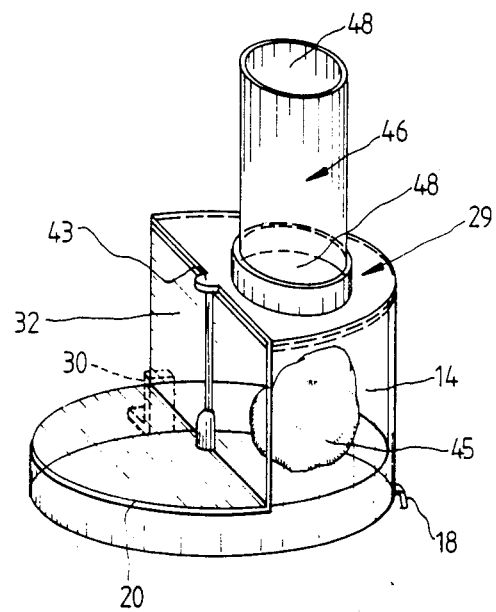
FIG. 4 is a perspective view showing the receptacle in its fully retracted position which is at the same time the operating position of the food processor.
Figure 5:
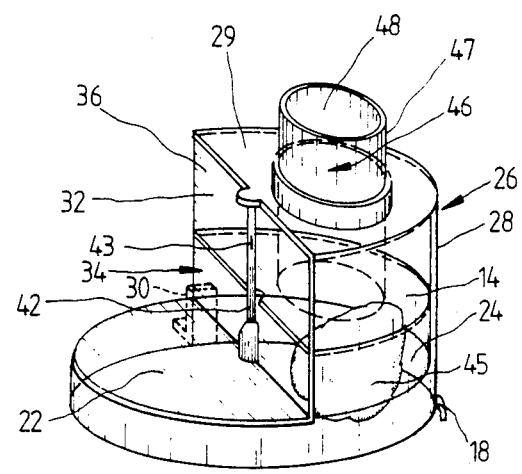
FIG. 5 is a view similar to the one of FIG. 4, with a pusher extending into the receptacle pushing the fruits down into the vessel.

The feed device 14 of FIGS. 1 and 1A is illustrated in detail in FIGS. 2 to 5. In FIGS. 1 and 2, the feed device 14 which forms the actual cover of the vessel 10 is provided on an annular flange member 16 adapted to be placed onto the top part of the vessel 10 and to be firmly secured thereto by locking means 18. The upper edge 20 of the flange member 16 is closed by positive engagement with a semi-circular lid segment 22, with an adjoining semi-circular passage 24 being provided in the same plane. Above the passage 24 is a cover member 26 of semi-cylindrical configuration having as outer boundaries a semi-circular cylinder wall 28 and a second lid segment 29 at its top. The cover member 26 has a vertically extending rectangular receiving opening 32 in the plane of which a semi-cylindrical receptacle 34 is arranged to swivel horizontally through 180° between a loading position as shown in FIG. 1 and an operating position as shown in FIGS. 4 and 5. The receptacle 34 is comprised of a rectangular side wall 36 and an outwardly adjoining semi-circular cylinder wall 38. In the drawings, the receptacle 34 has a filler opening 39 at the top and a discharge opening 40 at the bottom thereof (particularly FIG. 3).

In FIG. 3, the middle part of the side wall 36 of the receptacle 34 provides a tubular member 42 for receiving an axle 43 having its upper and lower end rotatably engaged with the second lid segment 29 and, respectively, the first lid segment 22. Since the receiving opening 32 extends vertically, dividing the annular flange member 16 into two halves, a receiving opening 32 of substantial width is obtained which may become even wider simply by extending the length of the cylinder wall in upward direction. As becomes apparent from FIGS. 2 and 3, the receptacle 34 is slightly smaller than the cover member 26, enabling the receptacle 34 to be fully received in the cover member 26 by swivelling it through 180° about the vertical axle 43.

In FIGS. 1 and 2, the receptacle 34 is shown pulled out which is the loading position in which whole fruits or large pieces of fruit 45 may be loaded, without the operator being able to reach inside the vessel since the side wall 36 blocks access to the passage 24 completely. In this position, the food processor 2 or the processing tool 12 is turned off because the stop means 30 provided on the end face of the receptacle 34 is not in engagement with the slot 41 in the housing 4 where a safety lock not shown in further detail prevents turning of the switch 8 and thus the supply of current to the motor.

After the foods 45 have been loaded into the receptacle 34, the latter is swivelled horizontally (FIGS. 3 and 4) until it is completely received in the cover member 26. In this position, the stop means 30 will release the switch 8, causing the appliance 2 to assume its operating position and enabling the motor to start rotating. Thus, the receptacle 34 has assumed the position shown in FIG. 5 in which the fruits 45 are discharged through the passage 24 into the interior of the vessel 10 (FIG. 1).

To facilitate the discharge of the fruits 45 in the receptacle 34, an additional feed hole 46 with a pusher 47 arranged vertically slidably therein may be provided in the second lid segment 29. The pusher 47 is a hollow structure. In FIG. 1A, the pusher 47 urges the fruits against the shredding disc 13 which shreds them as it rotates, the shreds dropping subsequently into the lower part of the vessel 10. The feed hole 46 provides a second filler opening 48 for feeding smaller pieces of fruit. As becomes apparent from FIGS. 1 to 5, in this arrangement the second filler opening 48 is substantially smaller than the passage 24 or the area of cross section of the receiving opening 32. The second filler opening 48 is at least so small that the operator's hand cannot reach therethrough.

In the operating position of FIG. 5, the side wall 36 of the receptacle 34 closes again the passage 24 completely so that in this position, too, the inside of the vessel 10 is inaccessible to the user. Consequently, the food processing apparatus 2 incorporating the feed device 14 constructed in accordance with the invention eliminates the possibility of operator access to the inside of the vessel 10 in either position of the receptacle 34. Since the food processing apparatus 2 can only be turned on when in the position shown in FIG. 5, personal injury by the blade 12 while at rest is avoided also in the intermediate position shown in FIG. 3 when the reduced area of cross section 50 would permit the operator's hand to reach inside the vessel. Normally, however, the area of cross section 50 is so small when the receptacle 34 is in the intermediate position of FIG. 3 that operator access to the interior of the vessel 10 is not possible. The feed device 14 is configured such as to permit it to be readily substituted for conventional covers of food processing apparatus 2 of this type which are usually equipped with a feed device of small diameter.

It is to be understood that shredding or cutting discs installed on a disc mount seated on the drive shaft may be substituted for the processing tool 12 of FIG. 1 (see FIG. 1A), such discs being then positioned at the elevation of the opening of the vessel 10. In the cutting operation, the foods 45 are held in the receptacle 34 without slipping down since the shredding or cutting discs act as the lower boundaries for the foods 45. Only after being processed by the discs will the foods be allowed to drop into the vessel 10 through the slots provided in the discs. Therefore, it is also necessary that the annular flange member 16 be kept very low to prevent the food material 45 from entering the space below the receptacle 34.

We claim:
1. Feed apparatus for a kitchen apparatus for preparing food, said kitchen apparatus including open-topped vessel structure in which a food processing tool is adapted to be disposed for rotation about an axis,
   said feed apparatus including lid structure adapted to engage the open top of said vessel,
   a cover structure that has a receiving opening, and
   a food receiving receptacle mounted on axle structure carried by said cover structure and extending substantially parallel to the axis of rotation of the processing tool in said vessel, said axle structure being located in approximately the same plane as the receiving opening of said cover structure,
   said receptacle being adapted to be swiveled about said axle structure between a first position outside of said cover structure and a second position in said cover structure.

2. Feed apparatus as claimed in claim 1 wherein said receptacle is arranged on said lid structure in a manner enabling it to swivel through about 180° between said first position and said second position.

3. Feed apparatus as claimed in claim 1 wherein said receptacle is adapted to be swivelled out of said cover structure completely when in said first position and to be swivelled into said cover structure completely when in said second position.

4. Feed apparatus as claimed in claim 1 wherein said receptacle has at least one vertically extending side wall the width and length of which correspond approximately to the size of said receiving opening.

5. Feed apparatus as claimed in claim 4 wherein said side wall is adapted to rotate through at least 180° in the area of said receiving opening by means of said axle structure.

6. Feed apparatus as claimed in claim 1 wherein said cover structure includes a semi-cylindrical housing member into which the likewise semi-cylindrical, yet somewhat smaller, receptacle is adapted to swivel to be received therein completely.

7. Feed apparatus as claimed in claim 6 wherein said lid structure has a semi-circular passage above which said semi-cylindrical housing member is arranged having its upper edge closed by a semi-circular wall.

8. Feed apparatus as claimed in claim 1 wherein said receiving opening in said cover structure has a rectangular area of cross section.

9. Feed apparatus as claimed in claim 1 wherein said lid structure is formed of a cylindrical lid segment and a semi-cylindrical cover member (26) and is adapted to close the open top of said vessel.

10. Feed apparatus as claimed in claim 1 wherein said cover structure provides, in addition to said first receiving opening, a second receiving opening that has a cross sectional area of passage smaller than the cross sectional area of passage of said first receiving opening.

11. Feed apparatus as claimed in claim 1 wherein said cover structure combines with said receptacle to provide a cylindrical structure when in said first loading first loading position.

12. Feed apparatus as claimed in claim 1 wherein said axle structure has its ends rotatably engaged with said lid structure and with a lid segment said cover structure.

13. Feed apparatus as claimed in claim 1 and further including stop means provided on said receptacle, said stop means being adapted to unlock a safety device provided in the housing of the kitchen apparatus only after proper closing of said receiving opening by said receptacle, of the opening of said vessel by the cover structure and said lid structure.

14. The feed apparatus of claim 1 wherein said receptacle has at least one vertically extending side wall, the width and length of which correspond approximately to the size of said receiving opening; said receptacle is adapted to be swivelled out of said cover structure completely when in the loading position and to be swivelled into said cover structure completely when in the discharge position; and said side wall is adapted to rotate through at least about 180° in the area of said receiving opening by means of said axle structure.

15. The feed apparatus of claim 1 wherein said vessel is adapted to be closed by lid structure formed of a cylindrical lid segment and a semi-cylindrical cover member, said receptacle is of semi-cylindrical configuration, said cover structure includes semi-cylindrical housing structure into which said semi-cylindrical receptacle is adapted to swivel to be received therein completely, said lid structure has a semi-circular passage above which said semi-cylindrical housing structure is arranged having its upper edge closed by a semi-circular lid; and said receiving opening in said cover structure has a rectangular area of cross section.

16. The feed apparatus of claim 1 and further including a safety device, stop means provided on said receptacle, said stop means unlocking said safety device only after proper closing of the receiving opening of said vessel; and wherein said axle structure of said receptacle has its ends rotatably engaged with the lid segment of said vessel and with a lid segment of said cover structure, respectively.

17. The feed apparatus of claim 16 wherein said receptacle has at least one vertically extending side wall, the width and length of which correspond approximately to the size of said receiving opening; said receptacle is adapted to be swivelled out of said cover structure completely when in the loading position and to be swivelled into said cover structure completely when in the discharge position; and said side wall is adapted to rotate through at least about 180° in the area of said receiving opening by means of said axle structure.

18. The feed apparatus of claim 17 wherein said vessel is adapted to be closed by lid structure formed of a cylindrical lid segment and a semi-cylindrical cover member, said receptacle is of semi-cylindrical configuration, said cover structure includes semi-cylindrical housing structure into which said semi-cylindrical receptacle is adapted to swivel to be received therein completely, said lid structure has a semi-circular passage above which said semi-cylindrical housing structure is arranged having its upper edge closed by a semi-circular lid; and said receiving opening in said cover member has a rectangular area of cross section.

* * * * *